(12) United States Patent
Fieberg et al.

(10) Patent No.: US 6,509,411 B1
(45) Date of Patent: Jan. 21, 2003

(54) AQUEOUS ELECTRODEPOSITION COATING, THE PRODUCTION AND USE THEREOF

(75) Inventors: Andreas Fieberg, Düsseldorf (DE); Volker Rekowski, Bochum (DE); Dietrich Saatweber, Wuppertal (DE); Hans-Ulrich Simmrock, Düsseldorf (DE); Bettina Vogt-Birnbrich, Solingen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/856,325

(22) PCT Filed: Nov. 24, 1999

(86) PCT No.: PCT/EP99/09063
§ 371 (c)(1),
(2), (4) Date: May 18, 2001

(87) PCT Pub. No.: WO00/34397
PCT Pub. Date: Jun. 15, 2000

(30) Foreign Application Priority Data

Dec. 10, 1998 (DE) .......................... 198 56 990
Jul. 23, 1999 (DE) .......................... 199 34 763

(51) Int. Cl.$^7$ .............................. C08G 18/62
(52) U.S. Cl. .................. 524/591; 524/901; 522/96; 205/224; 205/229; 427/458; 427/473; 526/301; 528/49; 528/75
(58) Field of Search .............. 528/49, 75; 522/96; 526/301; 524/901, 591; 427/458, 473; 205/224, 229

(56) References Cited

U.S. PATENT DOCUMENTS

| 3,954,587 A | | 5/1976 | Kokawa |
| 4,147,679 A | * | 4/1979 | Scriven et al. |
| 4,153,778 A | * | 5/1979 | Park et al. |
| 4,981,887 A | | 1/1991 | Ruhoff et al. |
| 5,415,749 A | | 5/1995 | Hamilton |

FOREIGN PATENT DOCUMENTS

| EP | 0473169 A2 | 3/1992 |

* cited by examiner

Primary Examiner—Rachel Gorr
(74) Attorney, Agent, or Firm—Steven C. Benjamin

(57) ABSTRACT

Aqueous, anodically precipitable electrodeposition lacquer, containing

A) an aqueous dispersion consisting of anionically modified polyurethane (meth)acrylates (a1) having terminal, ethylenically unsaturated (meth)acrylic double bonds, and reactive thinners (a2) having at least two ethylenically unsaturated (meth)acrylic double bonds, whereby the (meth)acrylic double bonds from the mixture comprising (a1) and (a2) correspond to a bromine number of 20 to 150 g bromine/100 g solids, and B) optionally photo-initiators and/or optionally thermally activable radical initiators, whereby the terminal ethylenically unsaturated (meth)acrylic double bonds from the polyurethane (meth)acrylates are bonded to the anionically modified polyurethane prepolymer via urethane, urea, amide or ester groups, and optionally conventional auxiliary substances and additives, pigments and/or fillers.

11 Claims, No Drawings

AQUEOUS ELECTRODEPOSITION COATING, THE PRODUCTION AND USE THEREOF

The invention concerns anodically precipitable, aqueous electrodeposition lacquers that can be cured by high-energy radiation and provide the advantage of good full cure even with elevated coating thicknesses and good mechanical properties together with, in particular, a high resistance in the industrial atmosphere. It also concerns their preparation and use for lacquering electrically conductive substrates, e.g. consisting of metal, electrically conducting plastics, e.g. metallised plastics, or electrically conducting coatings.

Coatings applied by the electrodeposition method display the advantage that they contain only a small quantity of residual water. Therefore the coating obtained need not be pre-dried after any adhering bath material has been rinsed away but can instead be cured by high-energy radiation after possible blowing-off of water drops.

EP-A-0 473 169 describes aqueous, heat-curable unsaturated polyurethane compositions having a weight-average molecular weight Mw of 20000 to 60000, which are used for example as top coats by spray application. They can also be cured by UV radiation, amongst other methods. The polyurethane compositions are obtained by chain extension of an isocyanate prepolymer containing unsaturated groups in the form of allyl groups and other ethylenically unsaturated groups, particularly in the form of unsaturated polyesters, with chain extenders having active hydrogen atoms. It has emerged that full cure of the coatings obtained in this way by irradiation with high-energy radiation is insufficient, particularly in the case of elevated coating thicknesses. Furthermore, the coatings are in need of improvement in terms of mechanical and chemical resistances, particularly their brittleness and resistance in an industrial atmosphere. At the same time, although it is mentioned that the polyurethane compositions can also be used for electrodeposition lacquering, it has emerged that the coatings obtained in this way exhibit inadequate flow.

The object underlying the invention was therefore to provide anodically precipitable, aqueous electrodeposition lacquers that do not exhibit these deficiencies, that cure fully by high-energy radiation even with elevated coating thicknesses and deliver lacquer films with improved properties in comparison to the prior art, particularly in regard to elasticity and resistance in an industrial atmosphere.

It has emerged that this object can be achieved with the anodically precipitable, aqueous electrodeposition lacquer forming a subject of the invention, which contains A) an aqueous dispersion containing one or more anionically modified polyurethane (meth)acrylates (a1) having terminal ethylenically unsaturated (meth)acrylic double bonds, and one or more reactive thinners (a2) having at least two ethylenically unsaturated (meth)acrylic double bonds, whereby the (meth)acrylic double bonds from the mixture comprising (a1) and (a2) correspond to a bromine number of 20 to 150 g bromine/100 g solids, and B) optionally one or more photo-initiators and/or optionally one or more thermally activable radical initiators, whereby the terminal ethylenically unsaturated (meth)acrylic double bonds from the polyurethane (meth)acrylates are bonded to the anionically modified polyurethane prepolymer via urethane, urea, amide or ester groups, and optionally conventional auxiliary substances and additives, pigments and/or fillers.

The term (meth)acrylic refers here to acrylic and/or methacrylic.

An aqueous anionic polyurethane dispersion consisting of, for example, 40 to 85 wt. % of component (a1), calculated as solid resin, and 15 to 60 wt. % of component (a2) is used as component (A). The aqueous anionic polyurethane dispersion (A) has, for example, a solids content (polyurethane (meth)acrylate plus reactive thinner) of 30 to 70 wt. %, preferably 40 to 55 wt. %. Its content of terminal ethylenically unsaturated (meth)acrylic double bonds corresponds to a bromine number of 20 to 150, preferably 20 to 80 g bromine/100 g solids (polyurethane (meth)acrylate plus reactive thinner).

The aqueous dispersion (A) can for example be prepared by the following method:

An anionically modified urethane prepolymer with terminal NCO groups is first prepared by reacting i) one or more aliphatic, cycloaliphatic, araliphatic and/or aromatic polyisocyanates, whereby the aromatic polyisocyanates preferably exhibit a molecular weight above 174, ii) one or more higher-molecular polyhydroxyl compound(s) having a number-average molecular weight (Mn) of, for example, 400 to 5000, preferably 1000 to 2500, iii) one or more compound(s) exhibiting one anionic group and two groups that are functional in respect of isocyanates and iv) optionally one or more low-molecular polyhydroxyl compounds, for example having a number-average molecular weight (Mn) of 60 to below 400.

The reaction can for example be performed in a one-stage or multi-stage process solvent-free or in a polar solvent that is inert in respect of NCO groups.

The quantities of components (i) to (iv) are chosen, for example, such that the ratio of NCO groups to OH groups is between 4:1 and 1.1:1.

The ethylenically unsaturated groups are then attached to the free NCO groups. This is achieved, for example, by reaction with compounds (v) exhibiting one or more ethylenically unsaturated (meth)acrylic groups and one or more groups that are reactive in respect of isocyanates, whereby the stoichiometric ratios of groups that are reactive in respect of NCO groups to isocyanate groups is chosen such that no free NCO groups remain.

In order to regulate the functionality (number of ethylenically unsaturated (meth)acrylic double bonds) compounds (vi) can additionally be used that exhibit one or more, preferably one, group that is reactive in respect of isocyanates, but contain no (meth)acrylic double bonds. They can contain other ethylenically unsaturated double bonds or can be free from them. The compounds (vi) can for example be introduced into the reaction following the reaction of components (i) to (iv) to produce a urethane prepolymer, before, along with or after reaction with component (v).

Alternatively, however, the free NCO groups can first be reacted with compounds containing, in addition to a group that is reactive in respect of isocyanates, one or more other reactive groups, which in turn can react with complementarily reactive groups of ethylenically unsaturated (meth) acrylic compounds, such as, for example, hydroxycarboxylic acid with glycidyl (meth)acrylate. In this way (meth) acrylic double bonds bonded to the polyurethane prepolymer can be introduced via ester groups, for example.

The anionically modified polyurethane (meth)acrylates having terminal ethylenically unsaturated (meth)acrylic double bonds (a1) exhibit for example a number-average molecular weight Mn of 800 to 5000 and/or a weight-average molecular weight Mw of 5000 to 20000, preferably below 20000. Their acid value is preferably from 5 to 50, particularly preferably from 10 to 35. Their content of terminal ethylenically unsaturated (meth)acrylic double bonds is preferably from 4 to 80 g bromine/100 g solid resin, particularly preferably 5 to 35 g bromine/100 g solid resin.

The component (a1) obtainable as described above is diluted with the reactive thinner (a2), at least partially neutralised and converted to the aqueous phase. At least 25% of the acid groups are present in neutralised form. The neutralising agent can be added before or with the water, or alternatively it can be introduced in advance into the water in which the polymer is dispersed. No addition of external emulsifiers is required. High-speed stirring disc units, rotor stator mixers or high-pressure homogenisers, for example, are used for conversion to the aqueous phase. The inert solvent is then optionally distilled off under vacuum.

The reactive thinner (a2) can alternatively be added subsequently to the already aqueous dispersion. In this case the aqueous dispersion is prepared as described above, whereby initially component (a1) is not yet diluted with the reactive thinner (a2) or is diluted with only part of the reactive thinner (a2).

Any organic diisocyanates and/or polyisocyanates with aliphatically, cycloaliphatically, araliphatically and/or aromatically bonded free isocyanate groups, which on average exhibit more than one, preferably two isocyanate groups per molecule, are suitable as polyisocyanates (i). Aliphatically, cycloaliphatically and/or araliphatically bonded diisocyanates and/or polyisocyanates are preferred. Aromatic diisocyanates preferably exhibit a molecular weight above 174.

Polyisocyanates containing around 3 to 36, particularly preferably 8 to 15 carbon atoms are preferred. Examples of suitable diisocyanates include diphenylmethane diisocyanate and in particular hexamethylene diisocyanate, tetramethylxylylene diisocyanate, isophorone diisocyanate, dicyclohexylmethane diisocyanate, cyclohexane diisocyanate and mixtures thereof.

The so-called "lacquer polyisocyanates", for example, based on hexamethylene diisocyanate, isophorone diisocyanate and/or dicyclohexylmethane diisocyanate, are highly suitable, whereby they are the known derivatives of these diisocyanates, exhibiting biuret, urethane, uretdione and/or isocyanurate groups.

Examples of suitable higher-molecular polyhydroxyl compounds (ii) are linear or branched polyols with a hydroxyl value of 30 to 150, for example. These are preferably saturated polyester and/or polyether diols and/or polycarbonate diols and/or so-called dimer fatty alcohols, each having a number-average molecular weight Mn of 400 to 5000, for example 500 to 5000, or mixtures thereof. Saturated polyester diols, polycarbonate diols and/or dimer fatty alcohols are particularly preferred.

Suitable linear or branched polyether diols are, for example, poly(oxyethylene) glycols, poly(oxypropylene) glycols and/or poly(oxybutylene) glycols.

Polyester diols are preferred and can be prepared by known means by esterification of dicarboxylic acids or their anhydrides with diols. In order to prepare branched polyesters, polyols or polycarboxylic acids with elevated functionality can additionally be used on a small scale.

Compounds are introduced as suitable compounds (iii) that contain two groups that react with isocyanate, e.g. H-active groups, and at least one group capable of anion formation. Suitable groups that react with isocyanate groups are in particular hydroxyl groups and primary and/or secondary amino groups. Groups that are capable of anion formation are, for example, carboxyl, sulfonic acid and/or phosphonic acid groups. Examples of such compounds are dihydroxycarboxylic acids such as dihydroxypropionic acid, dihydroxybutyric acid, dihydroxysuccinic acid, diaminobenzoic acid and preferably dimethylolalkanoic acids such as e.g. dimethylolpropionic acid.

Examples of suitable low-molecular polyhydroxyl compounds (iv) preferably have a number-average molecular weight Mn of 60 to below 500, for example 60 to below 400, and can contain aliphatic, alicyclic and/or aromatic groups. Suitable low-molecular polyhydroxyl compounds are, for example, diols, triols or polyols such as ethylene glycol, diethylene glycol, triethylene glycol, 1,2-propanediol, 1,3-propanediol, 1,4-butanediol, 1,2-butylene glycol, 1,6-hexanediol, trimethylol propane, castor oil or hydrogenated castor oil, pentaerythritol, 2-cyclohexanediol, 1,4-cyclohexane dimethanol, bisphenol A, bisphenol F, neopentyl glycol, hydroxypivalic acid neopentyl glycol ester, hydroxyethylated bisphenol A, hydrogenated bisphenol A and mixtures of these polyols.

Suitable compounds (v) exhibiting one or more ethylenically unsaturated (meth)acrylic groups and one or more groups reactive in respect of isocyanates contain hydroxyl, amino and/or amide groups as reactive groups. (Meth)acrylic double bonds bonded via urethane groups are introduced into the polyurethane prepolymer by means of the hydroxyl group-containing compounds (v); amino group-containing compounds (v) lead to bonding via urea groups; amide group-containing compounds (v) lead to bonding via "amide groups", whereby α-ketourea groups are formed in particular.

Examples of hydroxyl group-containing compounds (v) are hydroxy(meth)acrylates, such as e.g. hydroxyl group-containing esters of acrylic acid and/or methacrylic acid with 2 to 12, preferably 2 to 6 C atoms in the hydroxyalkyl radical, such as e.g. 2-hydroxyethyl(meth)acrylate, 3-hydroxypropyl(meth)acrylate, 4-hydroxybutyl(meth)acrylate, 5-hydroxypentyl(meth)acrylate, 6-hydroxyhexyl(meth)acrylate, 7-hydroxyheptyl(meth)acrylate, 8-hydroxyoctyl(meth)acrylate and the corresponding isomeric compounds, 2-hydroxy-1-methylethyl(meth)acrylate, 1,3-dimethyl-3-hydroxybutyl(meth)acrylate and others; reaction products of (meth)acrylic acid with polyols such as e.g. glycerol diacrylate, trimethylol diacrylate, pentaerythritol triacrylate; pre-adducts of glycidyl methacrylate and hydroxycarboxylic acids such as e.g. glycolic acid; reaction products of hydroxy(meth)acrylates with ε-caprolactone; reaction products of (meth)acrylic acid with the glycidyl ester of a carboxylic acid with a tertiary α-C atom such as e.g. Cardura® from Shell.

Examples of amino group-containing compounds are amino(meth)acrylates such as e.g. tert.-butyl aminoethyl (meth)acrylate, (meth)acrylic acid-β-ureido ethyl ester or reaction products of (meth)acrylic acid chloride and diamines.

Examples of compounds with amide groups are (meth)acrylamide, N-methylol (meth)acrylamide, isobutyl methylol (meth)acrylamide.

The compounds (v) can be used individually or as mixtures.

Suitable compounds (vi) for regulating functionality are, for example, higher glycol ethers and/or fatty alcohols and/or fatty amines. One or more aliphatic $C_4$–$C_{36}$ alcohols and/or amines can be used, for example, reaction of which then generally occurs with complete consumption of their OH—, NH— or $NH_2$ groups. Fatty amines and/or fatty alcohols with more than 12 C atoms are preferred. Examples are lauryl alcohol, stearyl alcohol and the corresponding amines.

Ethylenically unsaturated, particularly low-molecular and oligomolecular compounds, are suitable as reactive thinners (a2). In contrast to the polyurethane (meth)acrylate component (a1), the reactive thinners conventionally exhibit no anionic modifications. The low-molecular and/or oligomolecular reactive thinners can for example exhibit calculated molecular weights in the order of up to 10000, e.g. 100 to 10000. Suitable reactive thinners are for example di(meth) acrylates and poly(meth)acrylates of glycols with 2 to 6 C atoms and polyols with 3 to 4 OH groups and 3 to 6 C atoms, such as ethylene glycol diacrylate, propanediol-1,3-diacrylate, butanediol-1,4-diacrylate, hexanediol-1,6-diacrylate, trimethylol propane triacrylate, pentaerythritol triacrylate, pentaerythritol tetraacrylate and corresponding methacrylates, also di(meth)acrylates of polyether glycols of glycol, propanediol-1,3, butanediol-1,4, tetraethoxylated trimethylol propane triacrylate and/or oligourethane (meth) acrylates with 2 to 6 ethylenically unsaturated double bonds. Mixtures can also be used.

Conventional bases are suitable as neutralising agents, such as e.g. ammonia, NaOH, KOH. LiOH, primary, secondary and tertiary amines such as diethylamine, triethylamine, morpholine; alkanolamines such as diisopropanolamine, dimethylaminoethanol, triisopropanolamine, dimethylamino-2-methylpropanol: quaternary ammonium hydroxides or optionally also small quantities of alkylene polyamines such as ethylene diamine. Mixtures of such neutralising agents can also be used. The stability of the dispersion can be influenced by the choice of neutralising agents. The quantity of neutralising agent is generally selected such that at least 25% of the ionic groups are present in salt form.

The electrodeposition lacquers according to the invention can optionally contain one or more photo-initiators and/or optionally one or more thermally activable radical initiators. The electrodeposition lacquers according to the invention are preferably cured in the presence of photo-initiators, but curing can also take place without photo-initiators.

All conventional initiators for radically curing systems can be used as suitable photo-initiators (B), for example those that absorb in the wavelength range from 190 to 600 nm.

Examples are acetophenone and derivatives, benzophenone and derivatives, benzil, Michler's ketone, thioxanthone and derivatives, anthrone, anthraquinone and derivatives; benzoin and derivatives, benzoin ethers and derivatives, dialkoxyacetophenones, acyloxime esters, benzil ketals, hydroxyalkyl phenones; organophosphoric compounds, such as e.g. acylphosphine oxides; haloketones. The photo-initiators are used in conventional quantities, e.g. from 0.1 to 20 wt. %, preferably 0.1 to 5 wt. %, relative to the total of radically polymerisable polymers (a1) and reactive thinners (a2). The photo-initiators can be used individually or in combination.

In addition to the photo-initiators mentioned, so-called photo-activators, such as e.g. tertiary amines, can also be added. Synergistic effects are occasionally obtained with such combinations.

The anodically precipitable aqueous electrodeposition lacquer according to the invention can contain, in addition to the aqueous dispersion (A) and optionally the photo-initiator (B), conventional lacquer auxiliary substances and additives such as e.g. biocides, light stabilisers, flow control agents and optionally pigments and/or fillers.

The pigments and fillers can be the fillers conventionally used in the lacquers industry and inorganic or organic colouring and/or special effect pigments and anti-corrosive pigments. Examples of inorganic and organic colouring pigments are titanium dioxide, micronised titanium dioxide, zinc sulfide, lithopone, lead carbonate, lead sulfate, tin oxide, antimony oxide, iron oxides, chrome yellow, nickel titanium yellow, chrome orange, molybdenum red, mineral violet, ultramarine violet, ultramarine blue, cobalt blue, chrome oxide green, carbon black, azo, phthalocyanine, quinacridone, perylene, perinone, anthraquinone, thio indigo and diketopyrrolopyrrole pigments. Examples of special effect pigments are metal pigments, consisting of aluminium, copper or other metals, for example; interference pigments such as e.g. metal oxide-coated metal pigments or metal oxide-coated mica; pearlescent pigments and optically variable pigments (OVP).

Examples of fillers are calcium carbonate, barium sulfate, talc, silicon dioxide, aluminium silicates, magnesium silicates, mica, aluminium hydroxide and silicas. The fillers can also be modified (coated) with organic compounds, whereby the organic compounds can also contain UV-curable groups. Examples of fillers modified in such a way are coated micronised aluminium oxide or coated micronised silicon dioxide.

The anodically precipitable aqueous electrodeposition lacquer according to the invention can also contain further hydrophilic and/or hydrophobic polymers with or without reactive groups, such as e.g. carboxyl, hydroxyl, amino and other groups or mixtures of these polymers, which can optionally also be thermally cured.

Examples of such polymers are saturated or unsaturated polymers, such as e.g. acrylate or polyester resins, acrylic-modified acrylate or polyester resins, epoxy resins, amino resins, phenolic resins and blocked polyisocyanates.

The electrodeposition lacquer is prepared by mixing components (A) and optionally (B) together with further lacquer auxiliary substances and additives for example using conventional mixing units such as e.g. (high-speed) stirrers, static mixers, rotor stator mixers and other homogenisers.

The pigments and/or fillers that are optionally also used are processed to a pigment paste by known means in part of component (A) or a special paste resin using conventional dispersion methods, the pigment paste being admixed to components (A) and (B) as described above.

When an electrodeposition bath is used for the first time, the electrodeposition lacquer prepared in this way can optionally be adjusted to the desired bath MEQ value by means of additional neutralising agent and to the desired bath solids by means of demineralised water. The MEQ value is a measure of the content of neutralising agent in a waterborne lacquer. It is defined as the amount of milliequivalents of neutralising agent relative to 100 g solids.

In the case of post-compensation, the acid groups in component (A) are preferably only partially neutralised to compensate for the neutralising agent released during precipitation.

The bath MEQ value is for example 15 to 70, preferably 20 to 45 milliequivalents of neutralising agent, e.g. amine/100 g solids, the bath solids content is 5 to 25%, preferably 8 to 18%.

The electrodeposition lacquer according to the invention is suitable for coating work pieces with an electrically conductive surface, e.g. metal, electrically conductive (e.g. metallised) plastic, electrically conductive wood or electrically conductive coatings (e.g. lacquers), for example for priming and/or one-coat lacquering of household and electrical appliances, steel furniture, structural members and accessories for agricultural machinery and cars as well as car bodies, particularly for clear lacquer coating of aluminium, such as e.g. pre-treated aluminium profiles, and for sealing conductive coats (e.g. electrodeposition lacquer coats).

The coats produced with the electrodeposition lacquer according to the invention can however also be coated with further lacquer coats by conventional means to form a multi-coat structure.

In a suitable coating line, the substrate to be coated is immersed in the electrodeposition bath filled with electrodeposition lacquer according to the invention and connected as anode to a counterelectrode, which can also be formed by the coating vessel, in a d.c. circuit. Coating lines of this type are known to the person skilled in the art and are described for example in "Glasurithandbuch" 1984, pages 374–384.

A film of coating thicknesses of up to 60 μm, preferably between 20 and 50 μm, is precipitated for example at a coating temperature of 15 to 30° C., preferably 18 to 22° C., at a d.c. voltage of 50 to 500 volts, preferably 100 to 300 volts, for a coating time of 1 to 5 minutes, preferably 2 to 3 minutes.

Precipitation can be performed both intermittently and in a continuous process.

The precipitated film is freed from adhering bath material by being rinsed with ultrafiltrate and/or demineralised water and freed from clinging water drops by being blown in an optionally heated air stream or by being allowed to dry with the support of an IR radiator, and cured by exposure to high-energy radiation such as an electron beam, preferably UV radiation.

Any known radiation sources can be used for radiation curing of the coating compounds according to the invention. UV radiation sources with emissions in the wavelength range from 180 to 420 nm, particularly from 200 to 400 nm, are suitable, for example. Examples of such UV radiation sources are high-pressure, medium-pressure and low-pressure mercury radiators, gas discharge tubes such as e.g. xenon vapour, xenon/mercury vapour, germanium vapour (low-pressure) lamps, UV light-emitting diodes, UV light-emitting lasers. The irradiation can also be performed by means of pulsed radiation, for example pulsed UV radiation. So-called high-energy electron flash devices (UV flash lamps) are particularly preferably used as radiation sources, such as are described for example in WO-A-94 11 123 or EP-A-525 340 and are commercially available.

The irradiation time can be in the range from 1 millisecond to 30 minutes, for example, depending on the lacquer system and radiation source. The distance from the radiation source to the substrate surface to be coated is for example 2 to 50 cm, preferably 5 to 10 cm. The irradiation time is chosen such that as complete a cure as possible is achieved, i.e. development of the required technological properties is assured. To this end the substrate surface to be irradiated can be moved repeatedly past the radiation source or with the preferred use of UV flash lamps irradiation can occur with a multiple flash discharge. The flashes can for example be triggered every 4 seconds, since UV flash lamps require no stoving time.

The radiation sources are shielded from the environment to avoid radiation leakage.

It is also possible to use thermal activation to cure the coating compounds according to the invention in order to cure places that cannot be adequately exposed to radiation. To this end it can be advantageous to also use conventional thermally activable radical initiators such that a thermally activable radical polymerisation proceeds after irradiation or contemporaneously with irradiation.

Examples of thermally activable radical initiators are organic peroxides, organic azo compounds or C—C cleaving initiators such as for example dialkyl peroxides, peroxocarboxylic acids, peroxide carbonates, peroxide esters, hydroperoxides, ketone peroxides, azo dinitriles or benzopinacol silyl ethers.

The thermally activable radical initiators can also be used in a mixture. The preferred amounts used are around 0.1 to 5 wt. %, relative to t he total of radically polymerisable components (a1) and (a2).

The cured films precipitated with the aqueous electrodeposition lacquer according to the invention are characterised by high gloss and very good adhesion, particularly on aluminium substrates, and good edge coverage. In addition to high scratch resistance they exhibit excellent resistances to acids, alkali solutions and solvents and to industrial atmosphere, particularly acid waste gases such as sulfur dioxide, particularly in a humid atmosphere, as can be proven by the Kesternich test, for example (DIN or ISO 3231).

Further advantages include a fully automated process, high application efficiency, low-waste performability due to closed circuits, low-solvent or solvent-free procedure, extremely short cure times and low thermal stress on the substrates to be lacquered.

EXAMPLE 1

In a reaction vessel with stirrer, thermometer and reflux cooler, 349.4 g isophorone diisocyanate and 82.0 g dimethylol propionic acid are reacted in 381.2 g acetone at 60° C. until an NCO content of 10%. is reached. After addition of 698.4 g of a polyester diol formed from neopentyl glycol, adipic acid and isophthalic acid (hydroxyl value=106 mg KOH/g solid resin) the reaction is continued until an NCO content of 1.7% is reached.

12.4 g dodecanol and 15.5 g hydroxyethyl acrylate are added to 500 g of the NCO prepolymer solution thus obtained and reacted at 60° C. until the NCO content has fallen below 0.2%.

Dilution is performed with 126.1 g trimethylol propane triacrylate and the acetone removed by vacuum distillation.

500 g of the polyurethane acrylate thus obtained are neutralised with 13.3 g dimethyl ethanolamine and dispersed in 928 g demineralised water after being stirred for 1 hour at 60° C.

The dispersion thus obtained has a solids content (30 minutes 150° C.) of 35% and a content of terminal double bonds of 44 g bromine/100 g solids.

9 parts by weight of 2-hydroxy-2-methyl-1-phenyl propanone are dispersed in 857 parts by weight of the dispersion. Dilution is then performed with 1134 parts by weight of demineralised water.

Zinc-phosphated steel plates are coated in the electrodeposition bath thus obtained at a bath temperature of 26° C. for 2 minutes at an initial resistance of 200 ohms with 100 and 300 volts.

The precipitated film is rinsed with water and freed from clinging water drops by being blown with compressed air. It is then cured on a conveyor belt with 2 UV radiators (80 W/cm) at a belt speed of 3×3 m. The cured films have a coating thickness of 25 and 60 μm, exhibit high gloss and display very good flow.

Various tests were performed on the cured films having a coating thickness of 25 μm.

Test results:

| | |
|---|---|
| Kesternich test to DIN-ISO 3231 (0.21) (resistance to humid, sulfur dioxide-containing atmosphere) | after 10 cycles no blistering on the surface, no edge corrosion, no discoloration |
| Erichsen indentation to EN-ISO 1520 | 8.7 mm |
| Cross-hatch adhesion to EN-ISO 2409 | GT 0 |
| VDA flying stones test (1 kg, 2 bar) | Characteristic value <1 |

What is claimed is:

1. An aqueous anodically precipitable electrodeposition lacquer comprising an aqueous polyurethane dispersion comprising:
   (a1) at least one anionically modified polyurethane (meth)acrylate having terminal ethylenically unsaturated (meth)acrylic double bonds; and
   (a2) at least one reactive thinner having at least two ethylenically unsaturated (meth)acrylic double bonds;
   wherein the polyurethane (meth)acrylate is comprised of an NCO group-containing anionically modified polyurethane prepolymer and at least one ethylenically unsaturated (meth)acrylic compound, wherein said NCO group-containing anionically modified polyurethane prepolymer is the reaction product of:
      i) at least one aliphatic, cycloaliphatic, araliphatic or aromatic polyisocyanate,
      ii) at least one polyhydroxyl compound selected from the group consisting of polyester diols, polyether diols, polycarbonate diols, and dimer fatty alcohols having a number-average molecular weight Mn of 400 to 5000, and
      iii) at least one compound having one anionic group and two groups that are functional in respect of isocyanates, and
      iv) at least one low-molecular weight polyhydroxyl compound having a number-average molecular weight Mn of 60 to below 400;
   wherein the terminal ethylenically unsaturated (meth)acrylic double bonds of the polyurethane (meth)acrylates are bonded to the NCO group-containing anionically modified polyurethane prepolymer via groups selected from the group consisting of urethane, urea, amide, and ester; and wherein the NCO group containing anionically modified polyurethane prepolymer is further reacted with at least one compound having at least one isocyanate reactive functional group and zero terminal ethylenically unsaturated (meth)acrylic double bonds;
   further wherein the (meth)acrylic double bonds of the aqueous polyurethane dispersion have a bromine number of 20 to 150 g bromine/100 g solids.

2. The electrodeposition lacquer according to claim 1, wherein component (a1) has a bromine number of 4 to 80 g bromine/100 g solids.

3. The electrodeposition lacquer according to claim 1, wherein the aqueous polyurethane dispersion comprises 30–70 wt. % solids content, said solids content being comprised of 40 to 85 wt. % component (a1) and 15 to 60 wt. % component (a2).

4. The electrodeposition lacquer according to claim 1 further comprising at least one photo-initiator.

5. The electrodeposition lacquer according to claim 1 further comprising at least one thermally activatable radical initiator.

6. The electrodeposition lacquer according to claim 1 further comprising at least one component selected from the group consisting of conventional lacquer auxiliary substances, conventional lacquer auxiliary additives, pigments, and fillers.

7. The electrodeposition lacquer according to claim 1, wherein the aqueous polyurethane dispersion is formed by the following steps:
   I. preparing the anionically modified polyurethane (meth)acrylate of (a1) by the following steps:
      A) preparing the NCO group-containing anionically modified polyurethane prepolymer by reacting:
         i) at least one aliphatic, cycloaliphatic, araliphatic or aromatic polyisocyanate,
         ii) at least one polyhydroxyl compound selected from the group consisting of polyester diols, polyether diols, polycarbonate diols, and dimer fatty alcohols having a number-average molecular weight Mn of 400 to 5000, and
         iii) at least one compound having one anionic group and two groups that are functional in respect of isocyanates; and
         iv) at least one low-molecular weight polyhydroxyl compound having a number-average molecular weight Mn of 60 to below 400;
      B) reacting said anionically modified polyurethane prepolymer prepared in step A with at least one ethylenically unsaturated (meth)acrylic compound having at least one ethylenically unsaturated (meth)acrylic group and at least one isocyanate reactive functional group, said ethylenically unsaturated (meth)acrylic compounds being selected from the group consisting of hydroxyalkyl (meth)acrylates, aminoalkyl (meth)acrylates, and (meth)acrylamides; and further
      C) reacting said anionically modified polyurethane prepolymer prepared in step A with at least one compound having at least one isocyanate reactive functional group and at least one (meth)acrylic ester introducing group, wherein said compound is subsequently reacted to introduce a (meth)acrylic ester group;
      D) further reacting said anionically modified polyurethane prepolymer prepared in step C) with at least one compound having at least one isocyanate reactive functional group and zero terminal ethylenically unsaturated (meth)acrylic bonds;
   II. diluting the anionically modified polyurethane (meth)acrylate prepared in Step I with the reactive thinner of (a2); and
   III. adding a neutralizing agent to convert the dispersion prepared in Steps I and II to the aqueous phase;
   wherein said isocyanate reactive functional groups are selected from the group consisting of hydroxyl, amino, and amide.

8. A process for preparing the electrodeposition lacquer according to claim 1, wherein the aqueous polyurethane dispersion is formed by the following steps:
   I. preparing the anionically modified polyurethane (meth)acrylate of (a1) by the following steps:
      A) preparing the NCO group-containing anionically modified polyurethane prepolymer by reacting:
         i) at least one aliphatic, cycloaliphatic, araliphatic or aromatic polyisocyanate, ii) at least one polyhydroxyl compound selected from the group consisting of polyester diols, polyether diols, polycarbonate diols, and dimer fatty alcohols having a number-average molecular weight Mn of 400 to 5000, iii) at least one compound having one anionic group and two groups that are functional in respect of isocyanates; and iv) at least one low-molecular weight polyhydroxyl compound having a number-average molecular weight Mn of 60 to below 400;

B) reacting said anionically modified polyurethane prepolymer prepared in step A with at least one ethylenically unsaturated (meth)acrylic compound having at least one ethylenically unsaturated (meth)acrylic group and at least one isocyanate reactive functional group, said ethylenically unsaturated (meth)acrylic compounds being selected from the group consisting of hydroxyalkyl (meth)acrylates, aminoalkyl (meth)acrylates, and (meth)acrylamides; and further C) reacting said anionically modified polyurethane prepolymer prepared in step A with at least one compound having at least one isocyanate reactive functional group and at least one (meth)acrylic ester introducing group, wherein said compound is subsequently reacted to introduce a (meth)acrylic ester group;

D) further reacting said anionically modified polyurethane prepolymer prepared in step C) with at least one compound having at least one isocyanate reactive functional group and zero terminal ethylenically unsaturated (meth)acrylic bonds II. diluting the anionically modified polyurethane (meth)acrylate prepared in Step I with the reactive thinner of (a2); and III. adding a neutralizing agent to convert the dispersion prepared in Steps I and II to the aqueous phase;

wherein said isocyanate reactive functional groups are selected from the group consisting of hydroxyl, amino, and amide.

9. A process for electrodeposition lacquering of an electrically conductive substrate comprising:

A) immersing said substrate in the electrodeposition lacquer of claim 1;

B) connecting said substrate as an anode to a counterelectrode to form a precipitated film; and C) curing the precipitated film with high-energy radiation.

10. The process according to claim 9, wherein said process further comprises the step of curing the film with thermal activation.

11. A substrate lacquered according to the process of claim 10.

\* \* \* \* \*